(12) United States Patent
Hjertberg et al.

(10) Patent No.: US 10,889,670 B2
(45) Date of Patent: *Jan. 12, 2021

(54) HIGH PRESSURE RADIAL POLYMERISATION PROCESS FOR A COPOLYMER OF ETHYLENE SILANE GROUPS CONTAINING COMONOMER

(71) Applicant: Borealis AG, Vienna (AT)

(72) Inventors: Thomas Hjertberg, Kungshamn (SE); Lars Lindgren, Gothenburg (SE); Lena Lindbom, Kungalv (SE); Roger Karlsson, Save (SE)

(73) Assignee: BOREALIS AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,581

(22) Filed: Dec. 5, 2018

(65) Prior Publication Data

US 2019/0106518 A1   Apr. 11, 2019

Related U.S. Application Data

(62) Division of application No. 15/532,677, filed as application No. PCT/EP2015/077670 on Nov. 25, 2015, now Pat. No. 10,167,354.

(30) Foreign Application Priority Data

Dec. 15, 2014   (EP) ..................... 14197898

(51) Int. Cl.
  *C08F 210/02*   (2006.01)
  *C08F 230/08*   (2006.01)
  (Continued)

(52) U.S. Cl.
  CPC .......... *C08F 210/02* (2013.01); *C08F 230/08* (2013.01); *C08K 5/42* (2013.01);
  (Continued)

(58) Field of Classification Search
  CPC ......... C08F 2/34; C08F 210/02; C08F 230/18
  (Continued)

(56) References Cited

U.S. PATENT DOCUMENTS 7,834,115 B2 * 11/2010 Johansson ............. C08F 210/02
  526/279
10,167,354 B2 * 1/2019 Hjertberg ............. C08F 210/02

FOREIGN PATENT DOCUMENTS

EP    2 508 566 A1   10/2012
EP    2 636 690 A1   9/2013
(Continued)

*Primary Examiner* — Fred M Teskin
(74) *Attorney, Agent, or Firm* — Fay Sharpe LLP

(57) ABSTRACT

A copolymer of ethylene with silane groups containing comonomer that is produced in a high pressure radical polymerisation process comprising the steps of: (a) compressing ethylene together with the silane groups containing comonomer under pressure in a compressor, wherein a compressor lubricant is used for lubrication, (b) polymerising ethylene together with the silane groups containing comonomer in a polymerisation zone, (c) separating the obtained ethylene from the unreacted products and recovering the separated ethylene copolymer in a recovery zone, wherein in step a) the compressor lubricant comprises a mineral oil and ethylene copolymer has a silane groups containing comonomer content of 0.5 to 3 wt % and an MFR2 of 0.3 to 10 g/10 min. The copolymer of ethylene with silane groups containing comonomer can be used.

8 Claims, 1 Drawing Sheet

(51) Int. Cl.
*C08K 5/42* (2006.01)
*H01B 3/44* (2006.01)

(52) U.S. Cl.
CPC .......... *H01B 3/441* (2013.01); *C08F 2810/20* (2013.01); *H01B 3/448* (2013.01)

(58) Field of Classification Search
USPC .................................................. 526/64, 279
See application file for complete search history.

(56) References Cited

FOREIGN PATENT DOCUMENTS

| | | | |
|---|---|---|---|
| WO | WO 2011/057927 A1 | 5/2011 | |
| WO | WO 2011/160964 A1 | 12/2011 | |
| WO | WO 2013/159942 A2 * | 10/2013 | ............... C08K 3/00 |

* cited by examiner

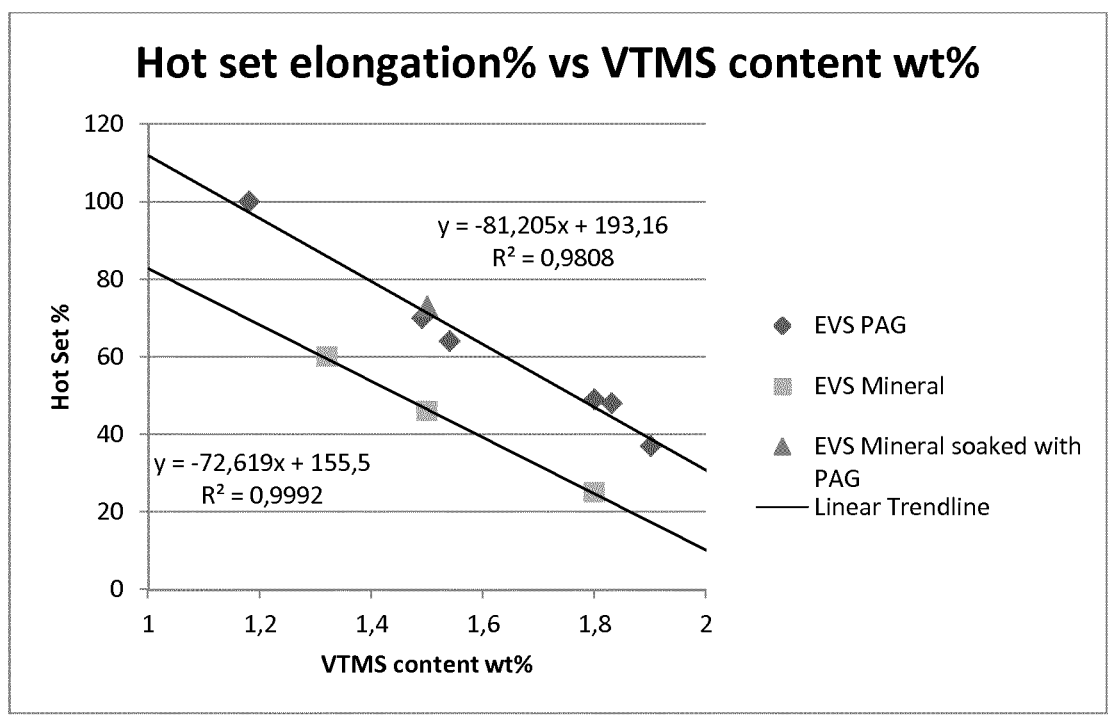

HIGH PRESSURE RADIAL POLYMERISATION PROCESS FOR A COPOLYMER OF ETHYLENE SILANE GROUPS CONTAINING COMONOMER

This application is a divisional of U.S. patent application Ser. No. 15/532,677, filed Jun. 2, 2017, now U.S. Pat. No. 10,167,354 B2, which is a 371 of PCT Patent Application Serial No. PCT/EP2015/077670, filed Nov. 25, 2015, which claims priority to European Patent Application Serial No. 14197898.1, filed Dec. 15, 2014.

FIELD OF INVENTION

This invention relates to a copolymer of ethylene with silane groups containing comonomer that is produced in a high pressure radical polymerisation process. The copolymer of ethylene can be used in a cable, suitably a low voltage cable. The benefits are better Oxygen Induction Time (OIT) and improve crosslinking response.

BACKGROUND OF INVENTION

High pressure radical polymerisation is typically operated at high pressures up to 4000 bar. In known high pressure reactor systems the starting monomer(s) need to be compressed (pressurised) before introduced to the actual high pressure radical polymerisation reactor. Compressor lubricants are conventionally used in the hyper compressor(s) for cylinder lubrication to enable the mechanically demanding compression step of starting monomer(s). It is well known that small amounts of the lubricant normally leaks through the seals into the reactor and mixes with the monomer(s). In consequence the reaction mixture contains traces (up to hundreds of ppm, typically 300 ppm) of the compressor lubricant during the actual polymerisation step of the monomer(s). These traces of compressor lubricants can have an effect on the final polymer performance.

Compressor lubricant means herein a lubricant used in compressor(s), i.e. in hyper compressor(s), for cylinder lubrication.

Conventional commercial hyper compressor lubricants e.g. polyalkylene glycol (PAG):

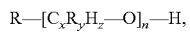

R—[$C_xR_yH_z$—O]$_n$—H, wherein R can be H or straight chain or branched hydrocarbyl and x, y, z, n are independent integers that can vary in a known manner, and lubricants based on a mineral oil (by-product in the distillation of petroleum) can be mentioned. Hyper compressor lubricants which are based on mineral oils that meet the requirements set for the white mineral oil in European Directive 2002/72/EC, Annex V, for plastics used in food contact, are used e.g. for polymerising polymers especially for the food and pharmaceutical industry. Such mineral oil-based lubricants contain usually lubricant additive(s) and may also contain other type of additive(s), such as antioxidants.

WO2009012041 of Dow discloses a high pressure polymerisation process, wherein compressors are used for pressurising the reactants, i.e. one or more monomer(s), the compressor lubricant may have an effect on the properties of the polymerised polymer. The document describes the use of a polyol polyether which comprises one or none hydroxyl functionality as a compressor lubricant for preventing premature crosslinking particularly of silane modified HP polyolefines. This is due to the presence of both multiple hydroxyl groups and the hydrophilic ethylene oxide groups, these lubricants are quite hydrophilic, and this can result in increased water uptake by the polymer, especially a silane modified polymer. This is contrary to the present invention that uses mineral oils that are not affecting the crosslinking process.

WO2009012092 of Dow discloses a composition that comprise a high pressure polyolefin free of silane functionality and a hydrophobic polyether polyol of PAG type wherein at least 50% of its molecules comprise no more than a single hydroxyl functionality. The component appears to originate from a compressor lubricant. The composition is for cable applications and is stated to reduce electrical losses in medium and high voltage power cables.

EP2499176, EP2499197 & EP2499175 of Borealis disclose a polymer composition with improved electrical properties. This is achieved by using mineral oil in the hyper compressor to decrease conductivity of the insulation layer in a cable by optimising the space charge by controlling the overall polarity of the polymer. The object of the invention is to reduce any polarity of the polymer in order to get good electrical properties for medium and high voltage power cables.

There is a continuous need in the field of silane crosslinkable polymers which are suitable for demanding polymer applications such as wire and cable applications with high requirements and stringent regulations.

BRIEF DESCRIPTION OF THE DRAWINGS

FIG. 1 shows Hot set elongation % vs VTMS content wt % from table 3 crosslinked at 1 h in a 90° C. water bath

BRIEF SUMMARY OF INVENTION

The invention relates to a copolymer of ethylene with silane groups containing comonomer that is produced in a high pressure radical polymerisation process comprising the steps of:

(a) compressing ethylene together with the silane groups containing comonomer under pressure in a compressor, wherein a compressor lubricant is used for lubrication, (b) polymerising ethylene together with the silane groups containing comonomer in a polymerisation zone, (c) separating the obtained ethylene from the unreacted products and recovering the separated ethylene copolymer in a recovery zone, wherein in step a) the compressor lubricant comprises a mineral oil and ethylene copolymer has a silane groups containing comonomer content of 0.5 to 3 wt % and an $MFR_2$ of 0.3 to 10 g/10 min.

Copolymer of ethylene is defined to have more than at least 1000 repeating units and comprising of more than 50 wt % ethylene monomer, suitably 75 wt % and more suitably 90 wt %. The silane groups containing comonomer can be either one or a mixture of several comonomers containing silane groups.

The object of the invention is to have good thermal stability of the copolymer of ethylene with silane groups containing comonomer. This is important when the polymer is used in applications in which the copolymer of ethylene with silane groups containing comonomer is exposed to wind and weather. Another object of the invention is to provide a copolymer of ethylene with silane groups containing comonomer with good crosslinking properties. This can for example enable a decrease of silane groups containing comonomer or an increase of $MFR_2$ to enable improved extrudability (high $MFR_2$ means shorter polymer molecules which require more crosslinking points). In the examples of this invention it is showed that the silane content can be lowered while maintaining same crosslinking response. Further, the life time of the copolymer of ethylene with silane groups containing comonomer in exposed environments will be improved. The object of the invention is to improve intrinsic properties of the copolymer of ethylene with silane groups containing comonomer such as OIT and crosslinking response. OIT can for example be improved by additivation. In applications highly exposed to wind and weather the additives can be washed away. In such applications it is important to improve OIT of the copolymer of ethylene with silane groups containing comonomer without additivation.

The invention further relates to a cable comprising a conductor surrounded by one or more layers wherein at least one of said layer(s) comprises the copolymer of ethylene with silane groups containing comonomer. It also relates to a process for producing a copolymer of ethylene with silane groups containing comonomer wherein the ethylene copolymer with at least one silane groups containing comonomer that is produced in a high pressure radical process comprising the steps of:

(a) compressing ethylene together with the silane groups containing comonomer under pressure in a compressor, wherein a compressor lubricant is used for lubrication, (b) polymerising ethylene together with the silane groups containing comonomer in a polymerisation zone, (c) separating the obtained polyolefine from the unreacted products and recovering the separated polyolefine in a recovery zone, wherein in step a) the compressor lubricant comprises a mineral oil.

DETAILED DESCRIPTION OF INVENTION

High pressure radical polymerisation process is produced at high pressure (HP) by free radical initiated polymerisation, optionally using a chain transfer agent (CTA) to control the MFR of the polymer. The high pressure reactor can be e.g. a well-known tubular or autoclave reactor or a mixture thereof, suitably a tubular reactor. The high pressure radical polymerisation and the adjustment of process conditions for further tailoring the other properties of the copolymer of ethylene depending on the desired end application are well known and described in the literature, and can readily be used by a skilled person. Suitable polymerisation temperatures range up to 400° C., suitably from 80 to 350° C. and pressure from 70 MPa, suitably 100 to 400 MPa, more suitably from 100 to 350 MPa. Pressure can be measured at least after compression stage and/or after the tubular reactor. Temperature can be measured at several points during all steps.

Further details of the production of copolymers of ethylene by high pressure radical polymerisation can be found i.e. in the Encyclopedia of Polymer Science and Engineering, Vol. 6 (1986), pp 383-410 and Encyclopedia of Materials: Science and Technology, 2001 Elsevier Science Ltd.: "Polyethylene: High-Pressure, R. Klimesch, D. Littmann and F.-O. Mähling pp. 7181-7184.

Compression Step a) of the Process of the Invention:

Ethylene monomer, with silane groups containing comonomer and optional comonomer(s), is fed to one or more compressor(s) at compressor zone to compress the monomers up to the desired polymerisation pressure and to enable handling of high amounts of monomers at controlled temperature. Typical compressors, i.e. hyper compressors, for the process can be piston compressors or diaphragm compressors. The compressor zone usually comprises several compressors that can work in series and/or in parallel. The compressor lubricant of the invention is used for cylinder lubrication in at least one, suitably in all of the hyper compressor(s), present in the compressor zone. The compression step a) comprises usually 2-7 compression steps, often with intermediate cooling zones. Temperature is typically low, usually in the range of less than 200° C., suitably of less than 100° C. Any recycled monomers, ethylene, silane groups containing comonomer, and optional comonomer(s) can be added at feasible points depending on the pressure.

Polymerisation Step b) of the Process:

Suitably, the high pressure radical polymerisation process is effected at a polymerisation zone which comprises one or more polymerisation reactor(s), suitably at least a tubular reactor or an autoclave reactor, more suitably a tubular reactor. The polymerisation reactor(s), suitably a tubular reactor, may comprise one or more reactor zones, wherein different polymerisation conditions may occur and/or adjusted as well known in the HP field. One or more reactor zone(s) are provided in a known manner with means for feeding ethylene, silane groups containing comonomer, and optional comonomer(s), as well as with means for adding radical initiator(s) and/or further components, such as CTA(s). Additionally, the polymerisation zone may comprise a preheating section which is preceding or integrated to the polymerisation reactor. In one suitable high pressure radical polymerisation the ethylene, the silane groups containing comonomer(s), and optionally together with one or more comonomer(s) is polymerized in a suitable tubular reactor, suitably in the presence of chain transfer agent(s).

Tubular Reactor:

The reaction mixture is fed to the tubular reactor. The tubular reactor may be operated as a single-feed system (also known as front feed), wherein the total monomers flow from the compressor zone is fed to the inlet of the first reaction zone of the reactor. Alternatively the tubular reactor may be a multifeed system, wherein the ethylene, the silane groups containing comonomer, and the optional comonomer(s) or further component(s) (like CTA(s)) coming from the compression zone, separately or in any combinations, is/are split to two or more streams and the split feed(s) is introduced to the tubular reactor to the different reaction zones along the reactor. For instance 10-90% of the total monomer quantity is fed to the first reaction zone and the other 90-10% of the remaining monomer quantity is optionally further split and each split is injected at different locations along the reactor. Also the feed of initiator(s) may be split in two or more streams. Moreover, in a multifeed system the split streams of monomer(/comonomer(s)) and/or optional further component(s), and, respectively, the split streams of initiator(s) may have the same or different component(s) or concentrations of the components, or both.

The single feed system for the ethylene, silane groups containing comonomer, and optional comonomer(s) is most suitable in the tubular reactor for producing the polyolefin of the invention.

First part of the tubular reactor is to adjust the temperature of the feed of ethylene, silane groups containing comonomer, and the optional comonomer(s);

usual temperature is below 200° C., such as 100-200° C. The radical initiator(s) is added. As the radical initiator(s), any compound or a mixture thereof that decomposes to radicals at an elevated temperature can be used. Usable radical initiators, such as peroxides, are commercially available. The polymerisation reaction is exothermic. There can be several radical initiator injections points, e.g. 1-5 points, along the reactor usually provided with separate injection pumps. As already mentioned also the ethylene, the silane groups containing comonomer, and optional comonomer(s), are added at front and optionally the monomer feed(s) can be split for the addition of the monomer and/or optional comonomer(s), at any time of the process, at any zone of the tubular reactor and from one or more injection point(s), e.g. 1-5 point(s), with or without separate compressors.

Furthermore, one or more CTA(s) are suitably used in the polymerisation process of the ethylene with silane groups containing comonomer. CTA(s) can be selected from one or more non-polar and one or more polar CTA(s), or any mixtures thereof.

The compressor lubricant used in invention comprises a mineral oil which is a known petroleum product.

Mineral oils have a well-known meaning and are used i.e. for lubrication in commercial lubricants. "Compressor lubricant comprising a mineral oil" and "mineral oil-based compressor lubricants" are used herein interchangeably.

Mineral oil can be a synthetic mineral oil which is produced synthetically or a mineral oil obtainable from crude oil refinery processes.

Typically, mineral oil, known also as liquid petroleum, is a by-product in the distillation of petroleum to produce gasoline and other petroleum based products from crude oil.

The mineral oil of the compressor lubricant of the invention is suitably a paraffinic oil. Such paraffinic oil is derived from petroleum based hydrocarbon feedstocks.

The suitable subgroups of compressor lubricant apply for the synthetic mineral oil and for mineral oil produced from crude oil as stated above.

The compressor lubricant may comprise other component(s), such as lubricity additive(s) and/or other additive(s). Accordingly, compressor lubricant for the present invention may comprise conventional lubricant additive(s) and optionally other additive(s) such as antioxidants, as well known in the art.

The preferred compressor lubricant contains paraffinic hydrocarbons.

In one suitable embodiment, the compressor lubricant has a viscosity of $8.5 \times 10^{-6}$ m$^2$/s at 100° C. In a second suitable embodiment, the compressor lubricant contains 5% wt % or less of hydrocarbons with less than 25 carbon atoms.

In a third suitable embodiment, the compressor lubricant contains paraffinic hydrocarbons which consist of hydrocarbons with an average molecular weight (Mw) of 480 or more.

The above "amount of hydrocarbons", "viscosity" and "Mw" are suitably in accordance with the above European Directive 2002/72/EC of 6 Aug. 2002.

It is preferred that the compressor lubricant is according to each of the above embodiments.

More suitably, the compressor lubricant comprises a mineral oil which is conventionally used as compressor lubricants for producing plastics, e.g. LDPE, for medical or food industry, more suitably the compressor lubricant comprises a mineral oil which is a white oil, suitably a medical white oil. White oil has a well-known meaning.

The most suitable compressor lubricant of the invention meets the requirements given for white mineral oil in European Directive 2002/72/EC of 6 Aug. 2002, Annex V, for plastics used in food contact. Directive is published e.g. in L 220/18 EN Official Journal of the European Communities 15.8.2002.

Preferred mineral oil for the present invention is the by-product produced from crude oil as stated above.

The compressor lubricant of the invention can be a commercially available compressor lubricant or can be produced by conventional means, and is suitably a commercial lubricant used in high pressure polymerisation processes for producing plastics for medical or food applications. Non-exhaustive examples of suitable commercially available compressor lubricants are e.g. Exxcolub R Series compressor lubricant for production of polyethylene used in food contact and supplied i.e. by ExxonMobil, Shell Corena for producing polyethylene for pharmaceutical use and supplied by Shell, or CL-1000-SONO-EU, supplied by Sonneborn.

The compressor lubricant suitably contains no polyalkyleneglycol based components.

The compressor lubricant of the invention is used in a conventional manner and well known to a skilled person for the lubrication of the compressor(s) in the compressing step (a) of the invention.

In one embodiment of the invention is the copolymer of ethylene with silane groups containing comonomer selected according to:

(MFR$_2$[g/10 min]<1.8*silane groups containing comonomer[wt %]−0.6

One of object of the invention is to use a low amount of silane groups containing comonomer while retaining good crosslinking properties. If the MFR$_2$ and the silane groups containing comonomer[wt %] is selected according to equitation above will the copolymer of ethylene with silane groups containing comonomer retain a good crosslinking response. The Hotset of the copolymer of ethylene with silane groups containing comonomer crosslinked at 1 h in a 90° C. water bath suitably is below 60%, more suitably below 50%. There are several reasons for decreasing silane groups containing comonomer, such as cost, wear of equipment as described in EP2636690 of Borealis.

In one embodiment of the invention the copolymer of ethylene with silane groups containing comonomer has an MFR$_2$ from 0.5 to 2 g/10 min, suitably 0.7 to 1.5 g/10 min.

In a further embodiment the copolymer of ethylene with silane groups containing comonomer has a content of silane groups containing comonomer less than 2.0 wt %, more suitable less than 1 wt %. The content of silane groups containing comonomer content should be at least 0.3 wt %, more suitable at least 0.5 wt %. The copolymer of ethylene with silane groups containing comonomer has a content of silane groups containing comonomer of at least 0.2 wt %, more suitable at least 0.4 wt %.

The silane groups containing comonomer for copolymerising silane groups to produce polymer of ethylene is an unsaturated silane compound represented by the formula:

$$R^1SiR^2_qY_{3-q} \quad (I)$$

wherein $R^1$ is an ethylenically unsaturated hydrocarbyl, hydrocarbyloxy or (meth)acryloxy hydrocarbyl group, each $R^2$ is independently an aliphatic saturated hydrocarbyl group, Y which may be the same or different, is a hydrolysable organic group and q is 0, 1 or 2.

The silane groups containing comonomer can either be one comonomer or a mixture of two or more silane groups containing comonomers, suitably one.

Special examples of the unsaturated silane compound are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and R², if present, is a methyl, ethyl, propyl, decyl or phenyl group. Most suitable is vinyl triethoxysilane (VTES) or vinyl trimethoxy silane (VTMS).

In one embodiment of the invention the copolymer of ethylene with silane groups containing comonomer is made by copolymerising the ethylene monomer with vinyl triethoxy silane or vinyl trimethoxy silane comonomer in a high pressure radical process to produce the copolymer of ethylene with a copolymer with silane groups containing units.

The condensation reaction catalyst is suitably selected from carboxylates of metals, such as tin, zinc, iron, lead and cobalt; from a titanium compound bearing a group hydrolysable to a Brönsted acid, from organic bases; from inorganic acids; and from organic acids; more suitably from carboxylates of metals, such as tin, zinc, iron, lead and cobalt, from titanium compound bearing a group hydrolysable to a Brönsted acid as defined above or from organic acids. The condensation reaction catalyst is suitably acidic, more suitably a Brönsted acid. In an even more suitable embodiment the condensation reaction catalyst is a sulphonic acid, even more suitable an aromatic organic sulphonic acid, which is an organic sulphonic acid which comprises the structural element:

  (III) wherein

Ar is an aryl group which may be substituted or non-substituted, and if substituted, then suitably with at least one hydrocarbyl group up to 50 carbon atoms, and x is at least 1; or a precursor of the sulphonic acid of formula (III) including an acid anhydride thereof or a sulphonic acid of formula (III) that has been provided with a hydrolysable protective groups, e.g. an acetyl group that is removable by hydrolysis.

Such organic sulphonic acids are described e.g. in EP736065, or alternatively, in EP1309631, EP1309632.

In one embodiment the condensation reaction catalyst is an aromatic sulphonic acid, more suitably the aromatic organic sulphonic acid of formula (III). Said sulphonic acid of formula (III) as the condensation reaction catalyst may comprise the structural unit according to formula (III) one or several times, e.g. two or three times (as a repeating unit (II)). For example, two structural units according to formula (III) may be linked to each other via a bridging group such as an alkylene group.

Suitably the organic aromatic sulphonic acid of formula (III) has from 6 to 200 C-atoms, more suitably from 7 to 100 C-atoms.

Suitably x is 1, 2 or 3, and more suitably x is 1 or 2. Most suitably, Ar is a phenyl group, a naphthalene group or an aromatic group comprising three fused rings such as phenantrene and anthracene.

Non-limiting examples of the even more suitable sulphonic acid compounds of formula (II) are p-toluene sulphonic acid, 1-naphtalene sulfonic acid, 2-naphtalene sulfonic acid, acetyl p-toluene sulfonate, acetylmethanesulfonate, dodecyl benzene sulphonic acid, octadecanoylmethanesulfonate and tetrapropyl benzene sulphonic acid; which each independently can be further substituted.

Even more suitable sulphonic acid of formula (III) is substituted, i.e. Ar is an aryl group which is substituted with at least one C1 to C30-hydrocarbyl group. In this more suitable subgroup of the sulphonic acid of formula (III), it is furthermore suitable that Ar is a phenyl group and x is at least one (i.e. phenyl is substituted with at least one —S(=O)2OH), more suitably x is 1, 2 or 3; and more suitably x is 1 or 2 and Ar is phenyl which is substituted with at least one C3-20-hydrocarbyl group. Most suitable sulphonic acid (III) as the condensation reaction catalyst is tetrapropyl benzene sulphonic acid and dodecyl benzene sulphonic acid, more suitably dodecyl benzene sulphonic acid.

The amount of the condensation reaction catalyst is typically 0.00001 to 0.1 mol/kg polymer composition suitably 0.0001 to 0.01 mol/kg polymer composition, more suitably 0.0005 to 0.005 mol/kg polymer composition. The choice of the condensation reaction catalyst and the feasible amount thereof depends on the end application and is well within the skills of a skilled person.

The polymer of ethylene with silane groups containing comonomer may contain further comonomer(s) which are other than silane groups containing comonomer. Moreover, the polymer of ethylene with silane groups containing comonomer may contain further polar group(s) other than silane groups containing comonomers (referred herein as polar groups). In one embodiment the copolymer of ethylene with silane groups containing monomer contains also polar(s), which may be introduced by grafting a polar group(s) containing compound or by copolymerising a polar group(s) containing comonomer(s) (herein referred as polar comonomer). In this embodiment, the copolymer of ethylene is produced by polymerising ethylene monomer with silane groups containing comonomer and with at least one, suitably one, polar comonomer.

In one embodiment of the invention the copolymer of ethylene with silane groups containing comonomer further comprise polar comonomer(s) which are free from silane groups, suitable one or more polar comonomer (s), suitably one, polar comonomer.

Typical polar comonomers can be hydroxyl group(s), alkoxy group(s), carbonyl group(s), carboxyl group(s), ether group(s) or ester group(s), or a mixture thereof, can be used. More suitably, polar comonomer(s) containing carboxyl and/or ester group(s) can be used as said polar comonomer. Still more suitably the polar comonomer(s) is selected from the groups of acrylate(s), methacrylate(s) or acetate(s), or any mixtures thereof. Even more suitably selected from the group of alkyl acrylates, alkyl methacrylates or vinyl acetate, or a mixture thereof. Further preferably, said optional polar comonomers can be selected from C1- to C6-alkyl acrylates, C1- to C6-alkyl methacrylates or vinyl acetate.

Especially suitable polar comonomers are vinyl acetate (EVA), methyl (meth)acrylate (EMA & EMMA), ethyl acrylate (EEA), and/or butyl acrylate (EBA), most suitably from EBA, EMA and EEA. Two or more such olefinically unsaturated compounds may be used in combination. The term "(meth)acrylic acid" is intended to embrace both acrylic acid and methacrylic acid. The copolymer ethylene is produced by a high-pressure polymerisation with free radical initiation.

The density of the copolymer of ethylene is higher than 0.920 g/cm3. Suitably the density of the ethylene homo- or copolymer is not higher than 0.960 g/cm³, suitably lower than 0.940 g/cm³.

The invention relates to a cable comprising a conductor surrounded by one or more layers wherein at least one of said layer(s) comprises the copolymer of ethylene with silane groups containing comonomer according to any previous embodiment. Suitably, the cable is a low voltage power cable. Power cable is defined to be a cable transferring energy operating at any voltage level. Low voltage (LV) power cable typically operates at voltages of below 6 kV. Medium voltage (MV) power cables operate at higher voltage levels and in different applications than LV cables. A typical MV power cable usually operates at voltages from 6 to 36 kV. Typically MV power cables comprise of a conductor surrounded at least by an inner semiconductive layer, an insulation layer and an outer semiconductive layer with an outer jacketing layer. The insulation layer is well protected and main cause of degradation is electrical degradation from the electrical field of the conductor. LV power cable comprises of an electric conductor which is coated with an insulation layer or a combined insulation and jacketing layer, suitable an insulation layer. Suitably the cable insulation is extruded on the conductor. The conductor usually is aluminium or copper. Copper has better conductivity, but is well known to degrade polymers, such as polyethylene, faster than aluminium.

The LV power cable comprises an insulation layer wherein said insulation layer comprises the copolymer of ethylene with silane groups containing comonomer according to any previous embodiment. Suitably, the insulation layer is adjacent and in direct contact with conductor, suitably the conductor is a copper conductor. This embodiment utilizes the technical effect of the invention better. This is shown in the examples as a bigger improvement of OIT of copper cups compared aluminium cups. The choice of the cup materials is to exemplify copper and aluminium conductors.

In a more suitable embodiment of the invention the insulation layer is functioning as an insulation layer and jacketing layer, suitably a one layer cable. Such cables are usually exposed to wind and weather. OIT is a good indicator of the polymers resistance to wind and weather.

The invention further relates to a process for producing a copolymer of ethylene with silane groups containing comonomer according to any previous embodiment wherein the ethylene copolymer with at least one silane groups containing comonomer that is produced in a high pressure process comprising the steps of:

(a) compressing ethylene together with the silane groups containing comonomer under pressure in a compressor, wherein a compressor lubricant is used for lubrication, (b) polymerising ethylene together with the silane groups containing comonomer in a polymerisation zone, (c) separating the obtained polyolefine from the unreacted products and recovering the separated polyolefine in a recovery zone, wherein in step a) the compressor lubricant comprises a mineral oil.

Suitably, the polymerisation step b) is operated at a pressure up to 4000 bar, suitably from 700 to 4000 bar, and at a temperature of up to 400° C., suitably from 80 to 350° C.

Test Methods a) Melt Flow Rate

The melt flow rate $MFR_2$ was measured in accordance with ISO 1133 at 190° C. and a load of 2.16 kg for ethylene homo and copolymers.

b) Density: The density was measured according to ISO 1183D and ISO1872-2 for sample preparation.

c) Oxygen Induction Time (OIT)

OIT was measured according to EN728 and ISO TR 10837 at a temperature of 190 C to 210° C. with $O_2$ atmosphere.

d) Hot Set Elongation (%):

To determine that the crosslinkable polyethylene composition are properly cured the hot set elongation and permanent set are determined according to IEC 60811-507, by measuring thermal deformation at 200° C. and at a load of 0.20 MPa is used. Three dumb-bell test samples are prepared from a tape consisting of a polyethylene composition to be tested by cutting test samples from the tape. Each test sample is fixed vertically from upper end thereof in the oven and the load of 0.20 MPa are attached to the lower end of each test sample. After 15 min, 200° C. in oven the distance between the premarked lines is measured and the percentage hot set elongation calculated, elongation %. For permanent set %, the tensile force (weight) is removed from the test samples and after recovered in 200° C. for 5 minutes and then let to cool in room temperature to ambient temperature. The permanent set % is calculated from the distance between the marked lines.

e) The content (wt % and mol %) of polar comonomer present in the polymer and the content (wt % and mol %) of silane group(s) containing units (suitably comonomer) present in the polymer composition (suitably in the polymer):

Quantitative nuclear-magnetic resonance (NMR) spectroscopy was used to quantify the comonomer content of the polymer in the polymer composition.

Quantitative $^1H$ NMR spectra recorded in the solution-state using a Bruker Advance III 400 NMR spectrometer operating at 400.15 MHz. All spectra were recorded using a standard broad-band inverse 5 mm probehead at 100° C. using nitrogen gas for all pneumatics. Approximately 200 mg of material was dissolved in 1,2-tetrachloroethane-d2 (TCE-d2) using ditertiarybutylhydroxytoluen (BHT) (CAS 128-37-0) as stabiliser. Standard single-pulse excitation was employed utilising a degree pulse, a relaxation delay of 3 s and no sample rotation. A total of 16 transients were acquired per spectra using 2 dummy scans. A total of 32 k data points were collected per FID with a dwell time of 60 μs, which corresponded to a spectral window of approx. 20 ppm. The FID was then zero filled to 64 k data points and an exponential window function applied with 0.3 Hz line-broadening. This setup was chosen primarily for the ability to resolve the quantitative signals resulting from methyl-acrylate and vinyltrimethylsiloxane copolymerisation when present in the same polymer.

Quantitative $^1H$ NMR spectra were processed, integrated and quantitative properties determined using custom spectral analysis automation programs. All chemical shifts were internally referenced to the residual protonated solvent signal at 5.95 ppm. When present characteristic signals resulting from the incorporation of vinylacytate (VA), methyl acrylate (MA), butylacrylate (BA) and vinyltrimethylsiloxane (VTMS), in various comonomer sequences, were observed (Randell89). All comonomer contents calculated with respect to all other monomers present in the polymer.

The vinylacytate (VA) incorporation was quantified using the integral of the signal at 4.84 ppm assigned to the *VA sites, accounting for the number of reporting nuclie 18 per comonomer and correcting for the overlap of the OH protons from BHT when present:

$$VA=(I^*_{VA}-(I_{ArBHT})/2)/1$$

The methylacrylate (MA) incorporation was quantified using the integral of the signal at 3.65 ppm assigned to the 1MA sites, accounting for the number of reporting nuclie per comonomer:

$$MA=I_{1MA}/3$$

The butylacrylate (BA) incorporation was quantified using the integral of the signal at 4.08 ppm assigned to the 4BA sites, accounting for the number of reporting nuclie per comonomer:

$$BA=I_{4BA}/2$$

The vinyltrimethylsiloxane incorporation was quantified using the integral of the signal at 3.56 ppm assigned to the 1VTMS sites, accounting for the number of reporting nuclei per comonomer:

$$VTMS = I_{1VTMS}/9$$

Characteristic signals resulting from the additional use of BHT as stabiliser, were observed. The BHT content was quantified using the integral of the signal at 6.93 ppm assigned to the ArBHT sites, accounting for the number of reporting nuclei per molecule:

$$BHT = I_{ArBHT}/2$$

The ethylene comonomer content was quantified using the integral of the bulk aliphatic (bulk) signal between 0.00-3.00 ppm. This integral may include the 1VA (3) and αVA (2) sites from isolated vinylacetate incorporation, *MA and MA sites from isolated methylacrylate incorporation, 1BA (3), 2BA (2), 3BA (2), *BA (1) and αBA (2) sites from isolated butylacrylate incorporation, the *VTMS and αVTMS sites from isolated vinylsilane incorporation and the aliphatic sites from BHT as well as the sites from polyethylene sequences. The total ethylene comonomer content was calculated based on the bulk integral and compensating for the observed comonomer sequences and BHT:

$$E = (1/4) * [I_{bulk} - 5*VA - 3*MA - 10*BA - 3*VTMS - 21*BHT]$$

It should be noted that half of the α signals in the bulk signal represent ethylene and not comonomer and that an insignificant error is introduced due to the inability to compensate for the two saturated chain ends (S) without associated branch sites. The total mole fractions of a given monomer (M) in the polymer was calculated as:

$$fM = M/(E + VA + MA + BA + VTMS)$$

The total comonomer incorporation of a given monomer (M) in mole percent was calculated from the mole fractions in the standard manner:

$$M[mol\ \%] = 100 * fM$$

The total comonomer incorporation of a given monomer (M) in weight percent was calculated from the mole fractions and molecular weight of the monomer (MW) in the standard manner:

$$M[wt\ \%] = 100 * (fM*MW)/((fVA*86.09) + (fMA*86.09) + (fBA*128.17) + (fVTMS*148.23) + ((1 - fVA - fMA - fBA - fVTMS)*28.05))$$

randall89
J. Randall, Macromol. Sci., Rev. Macromol. Chem. Phys. 1989, C29, 201.

It is evident for a skilled person that the above principle can be adapted similarly to quantify content of any further polar comonomer(s) which is other than MA BA and VA, if within the definition of the polar comonomer as given in the present application, and to quantify content of any further silane group(s) containing units which is other than VTMS, if within the definition of silane group(s) containing units as given in the present application, by using the integral of the respective characteristic signal.

Materials

EVS PAG: Ethylene vinyl trimethoxy silane having a melt flow rate (MFR$_2$@190° C.) which is 1.0 g/10 min, with 0.3 wt % of Lowinox CPL available from Chemtura (CAS-no. 68610-51-5). The polyethylene was prepared by a high pressure radical polymerisation process in which the compressor lubricate compressor oil is a PAG oil (Orites 270DS).

EVS Mineral: Ethylene vinyl trimethoxy silane having a melt flow rate (MFR$_2$@190° C.) which is 1.0 g/10 min, with 0.3 wt % of Lowinox CPL available from Chemtura (CAS-no. 68610-51-5). The polyethylene was prepared by a high pressure radical polymerisation process in which the compressor lubricate compressor oil is a mineral oil.

CatMB SA, Condensation reaction catalyst master batch with a carrier of low density polymer of ethylene (MFR$_2$ is 7.5 g/10 min) containing 1.5 wt % dodecyl benzene sulphonic acid as condensation reaction catalyst and 2% Irganox 1010 as stabiliser was dry blended into the silane copolymers.

Preparations

The influences of compressor oil used in high pressure radical process on the thermal stability of copolymers of ethylene with silane groups containing comonomer have been measured. All examples, EVS PAG and EVS Mineral are made in a tubular reactor as described in comparative example 1 and 2 of EP2508566.

The thermal stability was evaluated by OIT measurements at 190° C. using aluminium cups. All samples are crosslinked with the same crosslinking master batch. The samples were mixed with 5% CatMB SA, condensation catalyst master batch, available from Borealis, which is a fully functionalised crosslinking master batch. The results are given in Table 1. It is evident that the EVS mineral oil has a better thermal stability compared to EVS PAG oil. The decrease in OIT is ca 30%. The negative effect of the PAG oil was confirmed by adding 300 ppm PA to the EVS mineral oil.

TABLE 1

| EVS with 1.3 wt % of VTMS | | |
| --- | --- | --- |
| Material | OIT | Relative OIT, % Al, 190° C. |
| EVS Mineral | 186 | 100 |
| EVS PAG | 126 | 68 |
| EVS Mineral + 300 ppm PAG | 151 | 81 |

Samples of copolymers of ethylene vinyl trimethoxy silane have further been evaluated regarding their performance on hot set. Copolymers of ethylene vinyl trimethoxy silane produced with mineral oil and PAG oil as lubricant in the hyper compressor have been compared to soaked copolymers of ethylene vinyl trimethoxy silane produced with mineral oil. The amounts of vinyl trimethoxy silane have been varied as disclosed in table 2.

All samples are crosslinked with the same crosslinking master batch. The samples were mixed with 5% CatMB SA. After extrusion the samples were crosslinked at 1 h in a 90° C. water bath. The effect was evaluated by measuring the hot set value at 200° C. The better crosslinking the lower is the hot set value, i.e. crosslinking response.

As seen in table 2 and FIG. 1 the hot set elongation (%) decreases with the content of vinyl trimethoxy silane (VTMS). There is a clear difference between the materials produced with mineral oil and PAG oil.

The results show a higher crosslinking response in the polymers with mineral oil compared to the polymers with PAG oil. The effect of the PAG oil was confirmed by adding 300 ppm PAG to the EVS Mineral material with 1.5 wt % VTMS.

TABLE 2

Vinyl trimethoxy silane content vs Hotset of examples with mineral oil and PAG oil.

|  | EVS PAG | EVS PAG | EVS PAG | EVS PAG | EVS PAG | EVS PAG | EVS Mineral | EVS Mineral | EVS Mineral | EVS Mineral soaked with PAG |
|---|---|---|---|---|---|---|---|---|---|---|
| Hot Set % | 100 | 70 | 64 | 49 | 48 | 37 | 60 | 46 | 25 | 73 |
| VTMS content wt % | 1.18 | 1.49 | 1.54 | 1.8 | 1.83 | 1.9 | 1.32 | 1.5 | 1.8 | 1.5 |

FIG. 1 is showing table 2. All examples are with and MFR$_2$ of 1 g/10 min. Examples of EVS with mineral oil and PAG oil are on a linear line. It can be deducted that the VTMS content can be decreased by typically 0.3 wt % while retaining same crosslinking response.

The invention claimed is:

1. A high pressure radical process for producing a copolymer of ethylene with a silane groups containing comonomer, the process comprising:
   (a) compressing the ethylene together with the silane groups containing comonomer under pressure in a compressor, wherein a compressor lubricant is used for lubrication,
   (b) polymerising the ethylene together with the silane groups containing comonomer in a polymerisation zone to form the ethylene copolymer,
   (c) separating the ethylene copolymer from unreacted products and recovering the separated ethylene copolymer in a recovery zone,
   wherein in step (a) the compressor lubricant comprises a mineral oil;
   wherein the ethylene copolymer has a silane groups containing comonomer content of 0.5 to 3 wt % and an MFR$_2$ of 0.3 to 10 g/10 min;
   wherein the copolymer has a hot set elongation percentage y satisfying:
   y<−81.205x+193.16, wherein x represents wt % of the silane groups containing comonomer, and
   wherein the polymerisation step b) is operated at a pressure of up to 4000 bar and at a temperature of from 80 to 350° C.

2. The process of claim 1, wherein the MFR$_2$ is from 0.5 to 2 g/10 min.

3. The process of claim 1, wherein the MFR$_2$ is from 0.7 to 1.5 g/10 min.

4. The process of claim 1, wherein the silane groups containing comonomer content is 0.5 wt % to 2 wt %.

5. The process of claim 1, wherein the silane groups containing comonomer content is 0.5 wt % to 1 wt %.

6. The process of claim 1, wherein the mineral oil is a petroleum product, or wherein the mineral oil comprises paraffinic hydrocarbons, or wherein the mineral oil does not comprise polyalkyleneglycol base components.

7. The process of claim 1, wherein the copolymer of ethylene with silane groups containing comonomer is crosslinked with a condensation reaction catalyst that is acidic.

8. The process of claim 7, wherein the condensation reaction catalyst is a sulphonic acid or a Bronsted acid.

* * * * *